United States Patent [19]
Bamford et al.

[11] Patent Number: 5,873,098
[45] Date of Patent: Feb. 16, 1999

[54] DYNAMIC SNAPSHOT SET ADJUSTMENT

[75] Inventors: Roger Bamford, Woodside; Boris Klots; Garret Swart, both of Palo Alto, all of Calif.

[73] Assignee: Oracle Corporation, Redwood Shores, Calif.

[21] Appl. No.: 841,541

[22] Filed: Apr. 23, 1997

[51] Int. Cl.⁶ .................................................... G06F 17/30
[52] U.S. Cl. ......................... 707/203; 707/202; 707/201; 707/206; 707/10; 707/8; 364/282.1; 364/281.4; 364/222.82
[58] Field of Search ........................... 364/282.1, 222.82, 364/264.8, 281.4; 707/202, 8, 201, 10, 206, 203

[56] References Cited

U.S. PATENT DOCUMENTS

| | | | |
|---|---|---|---|
| 4,627,019 | 12/1986 | Ng Fred | 707/8 |
| 4,631,673 | 12/1986 | Haas et al. | 707/100 |
| 4,646,229 | 2/1987 | Gerald | 707/203 |
| 4,648,036 | 3/1987 | Gallant | 707/203 |
| 4,853,843 | 8/1989 | Ecklund | 707/202 |
| 5,057,996 | 10/1991 | Cutler et al. | 707/103 |
| 5,129,083 | 7/1992 | Culter et al. | 707/103 |
| 5,247,672 | 9/1993 | Mohan | 711/152 |
| 5,263,155 | 11/1993 | Goldring | 707/202 |
| 5,280,612 | 1/1994 | Raymond et al. | 707/8 |
| 5,287,496 | 2/1994 | Chen et al. | 707/203 |
| 5,437,026 | 7/1995 | Borman | 707/202 |
| 5,471,614 | 11/1995 | Kakimoto | 395/672 |
| 5,551,023 | 8/1996 | Alonso | 707/8 |
| 5,701,480 | 4/1993 | Raz Yoav | 395/671 |
| 5,734,896 | 4/1996 | Hasan et al. | 707/202 |

OTHER PUBLICATIONS

Korth & Silberschartz, Database system Concepts, McGraw–Hill, (New York) pp. 380–385, 389–402, 1986.

"Concurrent Control in Distributed Database Systems", Brernstein & Goodman Computing Sueveys, vol.13, No. 2, pp. 185–221, Jun. 1981.

Richard E. Stearns, Ditributed Database Concurrency Control Using Before–Values; Proc. ACM–SIGMOD, Int. Conf. on Management of Data; pp. 74–83, 1987.

David P. Reed, Implementing Atomic Actions on Decentralized data; ACM Transactions on Computer Systems, vol.1, pp. 3–23, Feb. 1983.

Toshimi Minoura et al., Version–Based Access Capabilities for concurrency control of a database system; Pro. nt. onf. on Data Engineering; pp. 300–306, 1984.

*Primary Examiner*—Thomas G. Black
*Assistant Examiner*—Jean M. Corrielus
*Attorney, Agent, or Firm*—McDermott, Will & Emery

[57] ABSTRACT

A method and apparatus for determining whether a particular version of a data item may be used by a transaction are provided. To determine whether the particular version may be used by the transaction, a MUST-SEE set associated with the transaction is compared to an EXCLUDED set associated with the particular version, and a CANNOT-SEE set associated with the transaction is compared to an INCLUDED set associated with the particular version. The MUST-SEE set includes all transactions that have made updates that must be seen by the transaction. The EXCLUDED set includes all transactions that have made updates to the data item that have been removed from the particular version of the data item and all transactions that will make changes to the data item in the future. The CANNOT-SEE set includes all transactions that have made updates that cannot be seen by the transaction. The INCLUDED set includes all transactions that have made updates that are reflected in the particular version of the data item. The particular version can be supplied to the transaction if no member of the MUST-SEE set is also a member of the EXCLUDED set, and no member of the CANNOT-SEE set is also a member of the INCLUDED set.

13 Claims, 10 Drawing Sheets

DYNAMIC SNAPSHOT SET ADJUSTMENT

FIELD OF THE INVENTION

The present invention relates to a method and apparatus for accessing stored data, and more specifically, to a method and apparatus for determining which version of a data item to provide to a transaction that requests the data item.

BACKGROUND OF THE INVENTION

In typical database systems, users store, update and retrieve information by submitting commands or statements to a database application. To be correctly processed, the statements must comply with the database language that is supported by the database application. One popular database language is known as Structured Query Language (SQL).

A logical unit of work that is comprised of one or more database language statements is referred to as a transaction. When multiple users share a database system, it is impractical to allow only one transaction to execute at a time. However, when many transactions are allowed to execute at the same time, the issue of consistency arises. Transactional database management systems provide a special statement—"commit"—which a user or program submits to delineate the statements that make up a transaction.

To ensure predictable and reproducible results, techniques have been developed which protect concurrently executing transactions from interacting with one another in uncontrolled ways. Transactions are designed to make database changes in such a way that the database, as a whole, moves from one consistent state to another.

Not only must transactions leave the database in a consistent state upon completion, but transactions must also see the database in a consistent state when they begin. This condition is difficult to satisfy because there may be concurrently executing transactions, each of which may be causing a temporary inconsistency visible only within that single transaction. Consequently, transactions must not be able to see the changes made by concurrently executing transactions until those transactions commit (i.e. terminate and make their changes permanent).

One approach to ensure that transactions do not see changes made by concurrently executing transactions is to prevent transactions from reading a data item that has been updated until the transaction that updated the data item commits. However, this approach reduces the concurrency in the system by causing transactions that wish to read data items (readers) to wait for transactions that have written to data items (writers) to commit.

An alternate approach to ensure that transactions see a consistent view of the database is to provide a mechanism that allows a reader transaction to see a version of the data item that does not include the updates made by any uncommitted transaction. However, in systems that provide a less-than-newest version of a data item, it is not always apparent which versions of a data item can and cannot be supplied to a transaction. Further, among those versions of a data item that can be supplied to a transaction, some versions will consume more overhead to supply than other versions.

Based on the foregoing, it is desirable to provide a mechanism for determining which versions of a data item may be supplied to a transaction. It is further desirable to provide a mechanism that selects the versions of data items to supply to transactions in a way that reduces the overhead required to supply the version of the data item. Specifically, it is desirable to select versions that require less overhead to construct, while still ensuring that the versions seen are recent enough.

SUMMARY OF THE INVENTION

A method and apparatus for determining whether a particular version of a data item may be used by a transaction are provided. To determine whether the particular version may be used by the transaction, a MUST-SEE set associated with the transaction is compared to an EXCLUDED set associated with the particular version, and a CANNOT-SEE set associated with the transaction is compared to an INCLUDED set associated with the particular version.

The MUST-SEE set includes all transactions that have made updates that must be seen by the transaction. The EXCLUDED set includes all transactions that have made updates to the data item that have been removed from the particular version of the data item and all transactions that will make changes to the data item in the future. The CANNOT-SEE set includes all transactions that have made updates that cannot be seen by the transaction.

The INCLUDED set includes all transactions that have made updates that are reflected in the particular version of the data item. The particular version can be supplied to the transaction if no member of the MUST-SEE set is also a member of the EXCLUDED set, and no member of the CANNOT-SEE set is also a member of the INCLUDED set.

According to one aspect of the invention, techniques are provided for approximating the portions of the various sets that are potentially infinitely large. For example, a MUST-SEE time value may be stored to represent the MUST-SEE set, wherein all transactions that committed prior to the time represented by the MUST-SEE time value are considered to be in the MUST-SEE set. An INCLUDED time value may be used to represent the INCLUDED set, wherein all transactions that committed prior to the time represented by the INCLUDED time value are considered to be in the INCLUDED set.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for supplying data items from a database to transactions is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overdrive

Figure 1:
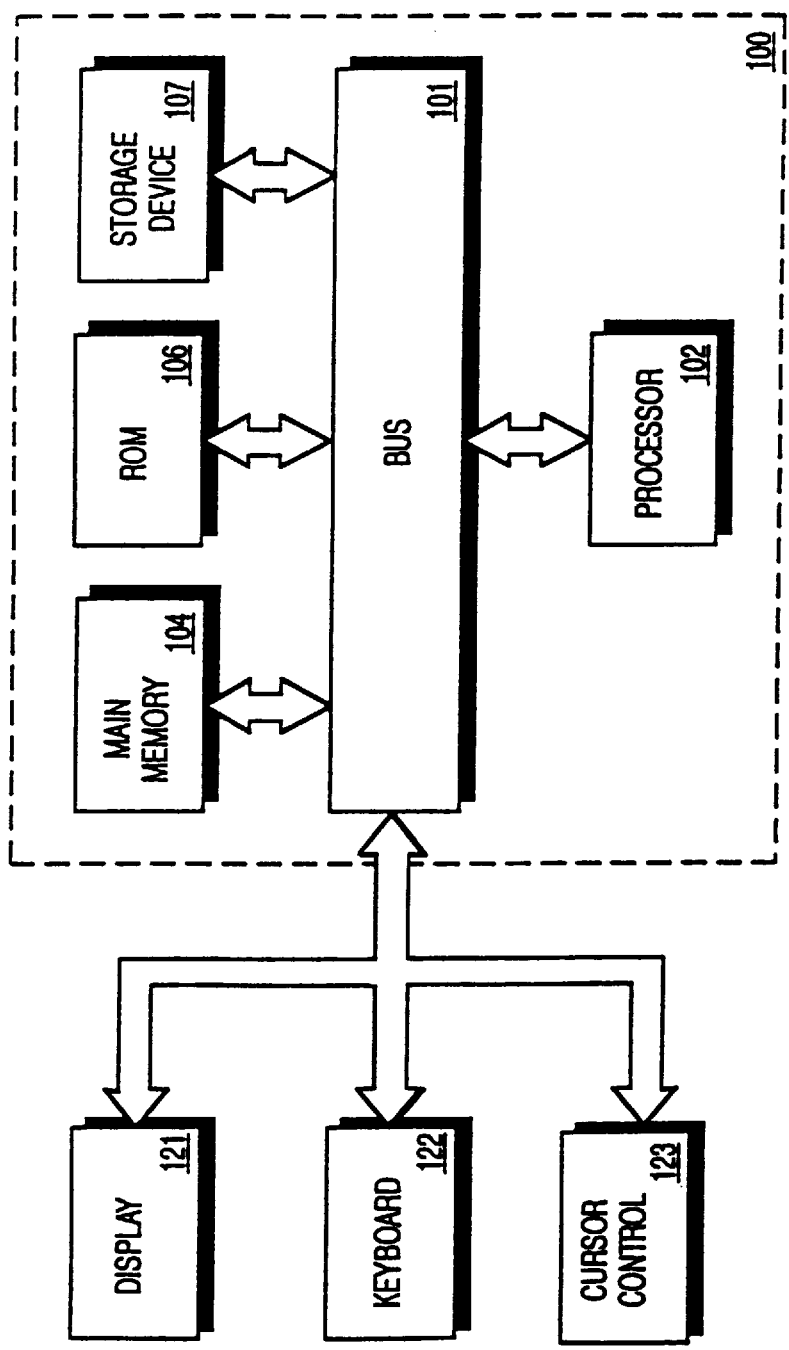
FIG. 1 is a block diagram of a computer system that may be used to implement the present invention.

Referring to FIG. 1, the computer system 100 upon which an embodiment of the present invention can be implemented. Computer system 100 comprises a bus 101 or other communication means for communicating information, and a processor 102 coupled with bus 101 for processing information. Computer system 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102. Data storage device 107 is coupled to bus 101 for storing information and instructions.

A data storage device 107 such as a magnetic disk or optical disk and its corresponding disk drive can be coupled to computer system 100. Computer system 100 can also be coupled via bus 101 to a display device 121, such as a cathode ray tube (CRT), for displaying information to a computer user. An alphanumeric input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121. This input device typically has two degrees of freedom in two axes, a first axis (e.g., x) and a second axis (e.g., y), which allows the device to specify positions in a plane.

Alternatively, other input devices such as a stylus or pen can be used to interact with the display. A displayed object on a computer screen can be selected by using a stylus or pen to touch the displayed object. The computer detects the selection by implementing a touch sensitive screen. Similarly, a light pen and a light sensitive screen can be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 122 wherein all interface is provided via the stylus as a writing instrument (like a pen) and the written text is interpreted using optical character recognition (OCR) techniques.

The present invention is related to the use of computer system 100 to supply data to transactions accessing a database. According to one embodiment, data is supplied by computer system 100 in response to processor 102 executing sequences of instructions contained in memory 104. Execution of the sequences of instructions contained in memory 104 causes processor 102 to select particular versions of data items to supply to the transactions, as will be described hereafter. In alternative embodiments, hard-wired circuitry may be used in place of or in combination with software instructions to implement the present invention. Thus, the present invention is not limited to any specific combination of hardware circuitry and software.

Consistent Read Mode

One approach to avoiding undesirable interaction between concurrent transactions is referred to herein as performing the transactions in "Consistent Read Mode". Consistent Read Mode is characterized by two rules. First, every statement executed by a Consistent Read Mode transaction sees only (1) changes that were committed to the database by a particular set of committed transactions and (2) changes made by prior statements of the transaction itself. This set of transactions whose changes are visible to a statement is referred to as its "snapshot set". This isolates transactions that are issuing reads from the changes made by excluded transactions that are concurrently issuing writes. Second, an updating transaction locks the rows it writes, and holds those locks until it commits. A lock on any given row may be held by only one transaction at a time. A row, as the term is used herein, refers to an exclusive set of one or more associated data elements.

Snapshots

A Consistent Read Mode transaction requires that statements see "snapshots" of the database. A statement's snapshot includes all changes made by the transactions in its snapshot set, and none of the changes made by any transactions that are not in its snapshot set ("excluded transactions").

The DBMS may allow changes to be made by excluded transactions before the Consistent Read Mode statement has been completely processed. After such changes have been made to the database, the database no longer reflects the version of the data that must be presented to the Consistent Read Mode statement. Consequently, systems that implement Consistent Read Mode must either disallow changes while Consistent Read Mode statements are in progress, or include a mechanism for providing to Consistent Read Mode statements the version of the data that existed in their snapshots.

The simplest way to provide snapshots of a database would be to make a copy of the database at a "snapshot time" (which must be at a time when no updating transactions are in progress). The snapshot set would consist of all transactions that had committed as of the snapshot time. A Consistent Read Mode statement would be assigned a particular snapshot time. Each Consistent Read Mode statement would simply be supplied data from the copy of the database that was made at its assigned snapshot time, rather than the current version of the database. While this solution is simple, the quantity of storage space and computational resources required to take and maintain the snapshots makes it impractical.

In an alternate approach, the database system "reconstructs" data accessed by a Consistent Read Mode statement by removing from the current data those changes made to the data by transactions not in the statement's snapshot set. Such an approach is described in U.S. patent application Ser. No. 08/613,026 entitled "METHOD AND APPARATUS FOR PROVIDING ISOLATION LEVELS IN A DATABASE SYSTEM", filed by Bamford et al. on Mar. 11, 1996 (hereinafter "Bamford") now allowed. The present invention is not limited to any particular mechanism for reconstructing versions of data.

Using Rules To Establish Static Snapshot Sets

As explained above, every statement of a Consistent Read Mode transaction must be supplied data that (1) reflects all of the changes made by transactions in the snapshot set of the statement, and (2) does not reflect any changes made by transactions excluded from the snapshot set. However, these Consistent Read Mode rules do not dictate which committed transactions should be included in the snapshot set of a given Consistent Read Mode statement.

To establish the snapshot sets for Consistent Read Mode statements, a database system may simply establish a set of rules to assign static snapshot sets based on execution times. For example, a database system may adopt the rule that all of the transactions that had committed as of the beginning of a given Consistent Read Mode statement would belong to the snapshot set of the statement. Alternatively, in order to support a transaction consistency mode referred to as "serializable" in which all statements of a transaction see the same versions of data, the database system might adopt the rule that the snapshot set of the statements of a serializable transaction would consist of all transactions that had committed as of the beginning of the transaction. Serializable mode is described in detail in Bamford.

The snapshot sets established by such rules are static in that the membership of the snapshot set is fixed at the time the statement or transaction begins and cannot be changed during its execution.

Snapshot Proliferation

The static snapshot set approach described above does not always produce the most efficient use of database resources. Specifically, the use of static snapshot sets tends to increase the number of versions of data that are in use at any given time. This tendency is referred to herein as "snapshot proliferation". To support more versions of the same data, more "reconstruction" operations must be performed and more buffer space is required to store different versions of the same set of data. An example of snapshot proliferation shall now be given with reference to FIG. 2.

Figure 2:
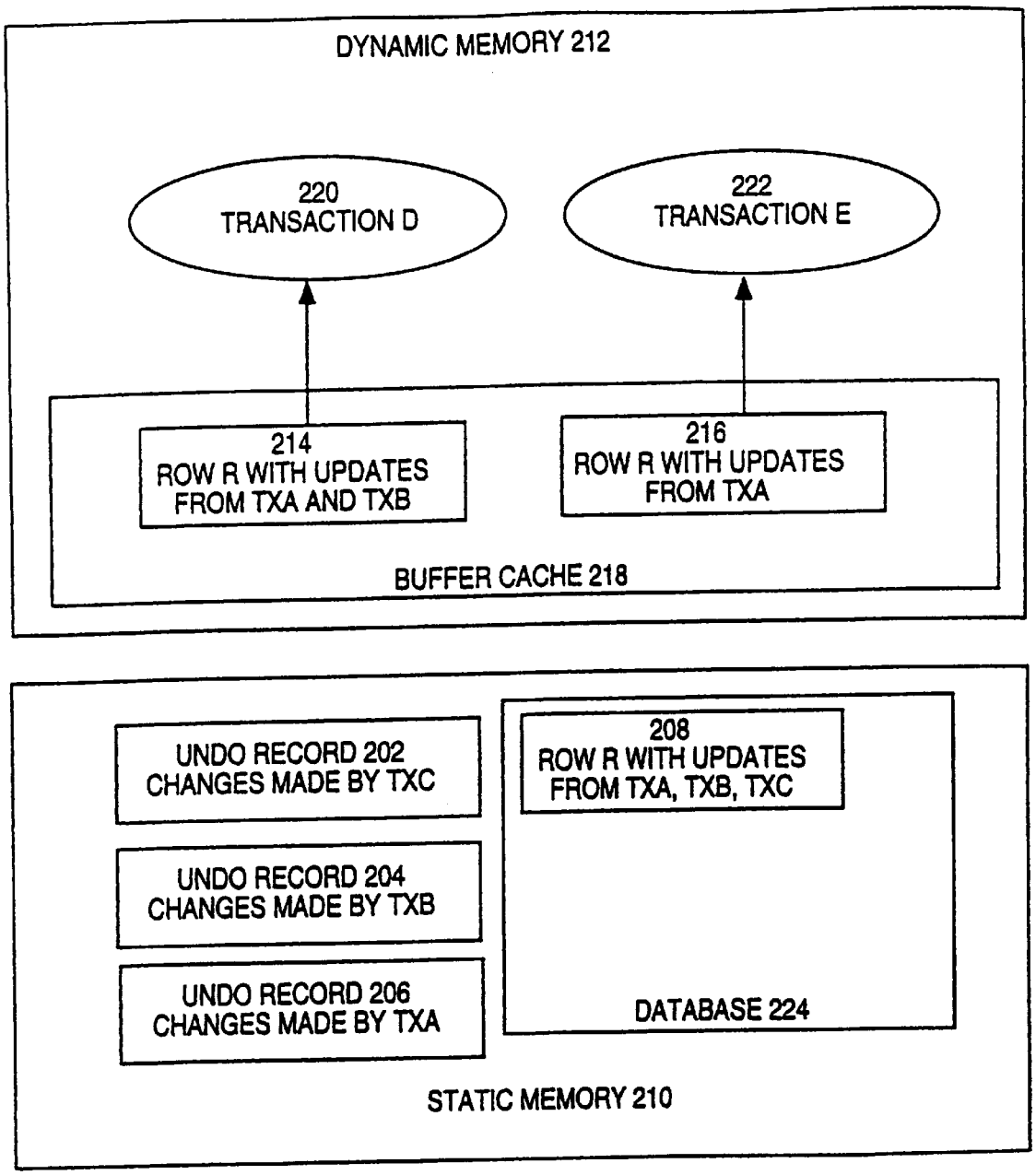
FIG. 2 is a block diagram of a computer system in which two transactions are supplied two different versions of a data item.

Referring to FIG. 2, it illustrates a database system 200 that includes a database 224 stored on static memory 210, such as a magnetic or optical disk. The database includes a version of a row R 208 that has been updated by three transactions, TXA, TXB, and TXC, in that order. Every time row R was updated, an undo record was generated that identifies the transaction that performed the update and includes information about how to undo the update. In the illustrated example, undo records 202, 204 and 206 are undo records for the updates made to row R by transactions TXC, TXB and TXA, respectively. The version of row R that is stored in the database shall be referred to as version 1.

Database system 200 includes dynamic memory 212 in which two serializable transactions D 220 and transaction E 222 are concurrently executing. It shall be assumed that both transactions D and E contain statements to read row R. It shall also be assumed that transaction D began execution after transactions TXA and TXB committed, but before TXC committed, and that transaction E began execution after transaction TXA committed, but before TXB and TXC committed.

In response to the statement of transaction D, a reconstruction mechanism in the database system 200 reconstructs a version of row R that reflects updates made by transactions TXA and TXB, but not the update made by transaction TXC. The reconstruction mechanism could perform this by applying the undo record 202 to the version of row R 208 that is stored in the database 224. For the purposes of explanation, the version of row R that reflects updates made by TXA and TXB, but not the update made by TXC, shall be referred to as "version 2" of row R. The database system would load version 2 of row R into a buffer cache 218 in dynamic memory 212. Transaction D would then read version 2 of row R 214 from the buffer cache 218.

In response to the statement of transaction E, the reconstruction mechanism of the database system 200 would reconstruct a version of row R that reflects updates made by TXA, but not the updates made by TXB or TXC. The reconstruction mechanism could perform this by applying the undo records 202 and 204 to the version of row R 208 that is stored in the database 224. For the purposes of explanation, the version of row R that reflects updates made by TXA, but not the updates made by TXB or TXC, shall be referred to as "version 3" of row R. The database system would load version 3 of row R into the buffer cache 218 in dynamic memory 212. Transaction E would then read version 3 of row R 216 from the buffer cache 218.

In the above example, a separate reconstruction operation was performed for each of transactions D and E, and two versions of row R were stored in the buffer cache. However, there may be no compelling reason for the changes made by TXC to be hidden from transaction D. If transaction D is allowed to see the changes made by TXC, then the reconstruction operation required to create version 2 of row R would not be necessary.

Further, there may be no compelling reason for the changes made by TXC or TXB to be hidden from transaction E. If transaction E is allowed to see the changes made by TXC and TXB, then transactions D and E can share version 1. If transaction E is allowed to use version 1 of row R, one less reconstruction operation would be required, and one less buffer in the buffer cache would be required. However, the inflexibility resulting from a static snapshot mechanism would require the reconstruction and storage of versions 2 and 3.

Dynamic Snapshot Set Adjustment

To ensure that a serializable transaction sees a consistent view of the database, the following rules must be followed: (1) if a change made by a transaction is reflected in data that has been supplied to a serializable transaction, then the serializable transaction must always see the changes made by the transaction, and (2) if a change made by a transaction has been removed from data that has been supplied to the serializable transaction, then all changes made by the transaction must be removed from data supplied to the serializable transaction.

According to one embodiment of the invention, a snapshot tracking mechanism is provided that increases the flexibility of the snapshot mechanism by allowing the membership of a snapshot set of a serializable transaction to be dynamically adjusted during execution of the serializable transaction without violating the Consistent Read Mode rules. By allowing the snapshot set associated with a serializable transaction to be dynamically adjusted, snapshot proliferation may be reduced by adjusting snapshot sets to allow the same version of data to be shared among multiple serializable transactions.

The Snapshot Adjustment Mechanism

According to one embodiment of the invention, two transaction sets are maintained for each serializable transaction. The transaction sets include a MUST-SEE set, and a CANNOT-SEE set. The MUST-SEE set includes all of the transactions that made updates that have been seen by the serializable transaction. The CANNOT-SEE set includes all of the transactions that made updates that were removed from data that has been seen by the serializable transaction and all transactions that subsequently update the seen data.

Before a serializable transaction accesses data, all transactions, including transactions that begin execution after the serializable transaction, may potentially be in the snapshot set of the serializable transaction. Consequently, the MUST-SEE and CANNOT-SEE sets are empty.

When a serializable transaction accesses data, the database system makes a decision with respect to which version of the data to supply to the serializable transaction. The database system may take into account a variety of considerations when determining which version of a data item to supply to a serializable transaction, including which versions are stored locally, which versions are stored remotely, and which versions reflect the most recent changes. Various techniques for determining which version of a data item to supply to a transaction shall be described in greater detail below.

Regardless of how a version is selected, once a version of a data item is supplied to a serializable transaction, all transactions that have updated or will update the data item are assigned to either the MUST-SEE set or the CANNOT-SEE set of the serializable transaction. Specifically, all transactions that made updates that were not removed from the version of the data item supplied to the serializable transaction are placed in the MUST-SEE set of the serializable transaction. All transactions that made updates that were removed from the version of the data supplied to the serializable transaction or that subsequently update the seen data are placed in the CANNOT-SEE set of the serializable transaction.

When the MUST-SEE and CANNOT-SEE sets of a serializable transaction are not empty, the database system is limited with respect to which versions of data may be supplied to the serializable transaction. Specifically, the database system may not supply a serializable transaction any version of any data item that either (1) reflects updates made by transactions that belong to the CANNOT-SEE set of the serializable transaction, or (2) has had removed from it any updates made by transactions in the MUST-SEE set of the serializable transaction. As long as neither of these two restrictions are violated, the database system may supply any version of a data item dictated by efficiency considerations that shall be discussed hereafter.

Update Tracking Mechanism

As mentioned above, a serializable transaction cannot be supplied a version of a data item that reflect updates from "cannot see" transactions or from which updates made by "must see" transactions have been removed. Consequently, a mechanism must be provided to track (1) which transactions have made updates that are reflected in a particular version of a data item, (2) which transactions have made updates that have been removed from a particular version of a data item, and (3) which transaction make updates to a data item after it has been read by the serializable transaction.

For the version of a data item that is stored in the database, the undo records provide a history of which transactions have performed updates that are reflected in the data. For example, by inspecting undo records 202, 204 and 206, a database system would be able to determine that the version of row R 208 stored in database 224 reflects changes made by transactions TXA, TXB and TXC. However, when a version of row R is reconstructed and stored in buffer cache 218, it is not immediately apparent which transactions which transactions have been included or excluded from the version.

According to one embodiment, the database system includes an update tracking mechanism that stores information to indicate which transactions are included and excluded from reconstructed versions of data. Thus, each version of reconstructed data stored in buffer cache 218 has a corresponding set of "INCLUDED" transactions and a corresponding set of "EXCLUDED" transactions. When the reconstruction mechanism is reconstructing a version of data, the reconstruction mechanism assigns to the "EXCLUDED" transaction set the transactions associated with the undo records that are applied by the reconstruction mechanism to create the version. The reconstruction mechanism assigns to the "INCLUDED" transaction set the transactions associated with the undo records that are not applied by to create the version.

For example, the reconstruction mechanism created the version 2 of row R (the version stored in buffer 214) by applying undo record 202 to version 1 of row R (the version stored in database 224). In creating version 2, the reconstruction mechanism did not apply undo records 204 and 206. Consequently, the transaction associated with undo record 202 (TXC) would be assigned to the EXCLUDED set of version 2, and the transactions associated with undo records 204 and 206 (TXB and TXA) would be assigned to the INCLUDED set of version 2.

By tracking the INCLUDED and EXCLUDED set of every version of data, the database system may determine whether a particular version of data may be supplied to a particular serializable transaction by comparing the INCLUDED set of a version against the CANNOT-SEE set of the serializable transaction and the EXCLUDED set of the version against the MUST-SEE set of the serializable transaction. Specifically, a serializable transaction may be supplied a particular version of data if and only if $((MS \cap EX) \cup (CS \cap INC)) = \emptyset$, where MS is the MUST-SEE set of the serializable transaction, EX is the EXCLUDED set of the version, CS is the CANNOT-SEE set of the serializable transaction, and INC is the INCLUDED set of the version.

Snapshot Adjustment Example

Figure 3A:
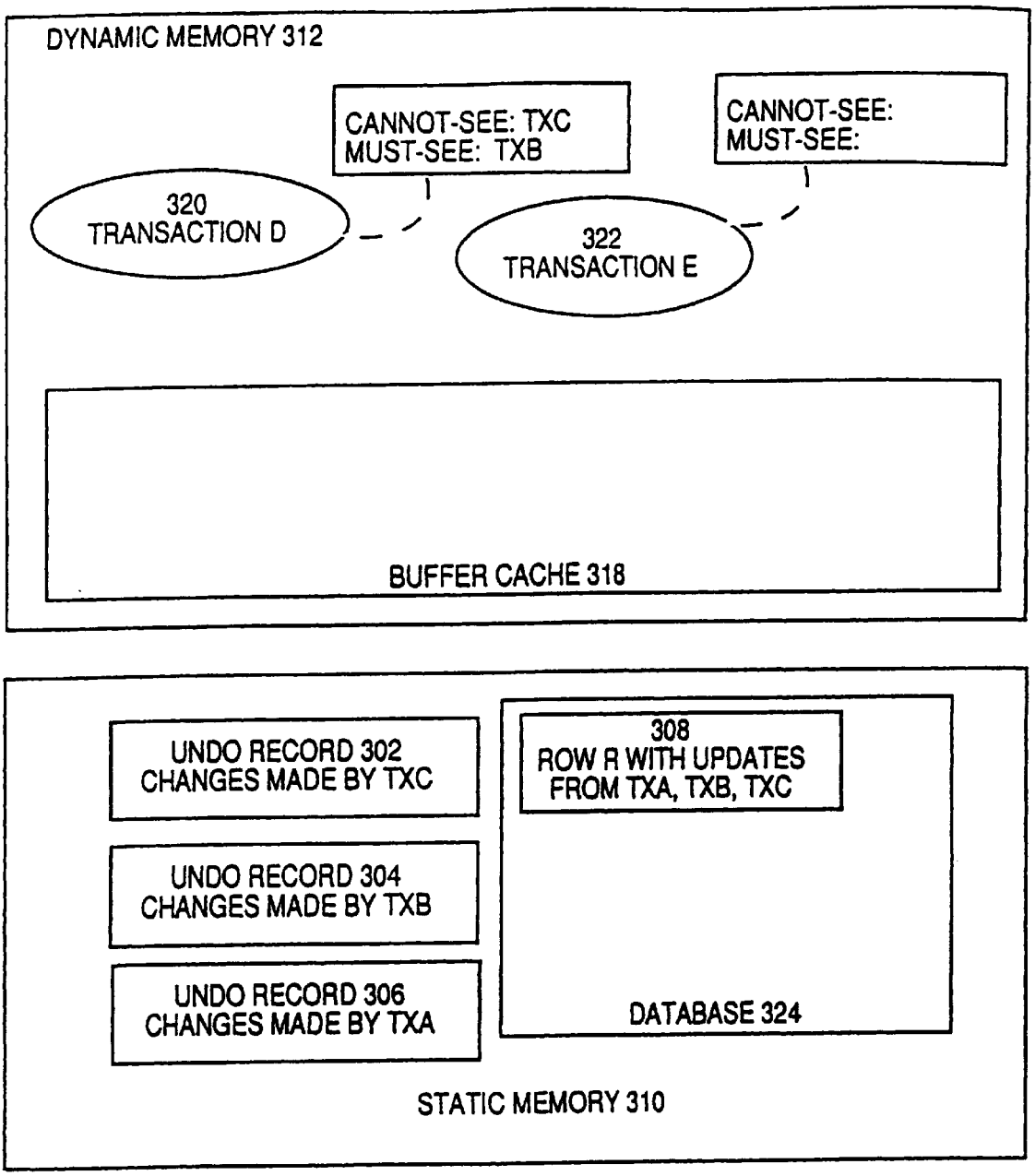
FIG. 3A is a block diagram of a computer system in which snapshot set data is maintained for each transaction according to an embodiment of the invention.
Figure 3B:
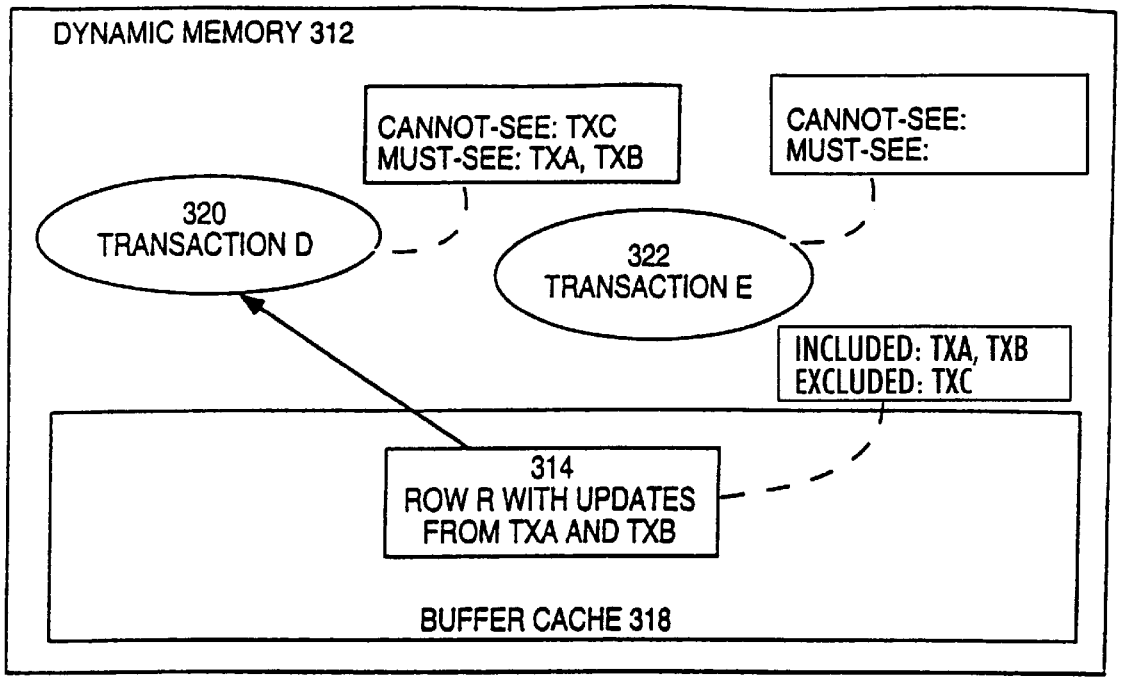
FIG. 3B illustrates supplying a version of a data item to a transaction in the computer system of FIG. 3A.
Figure 3B:
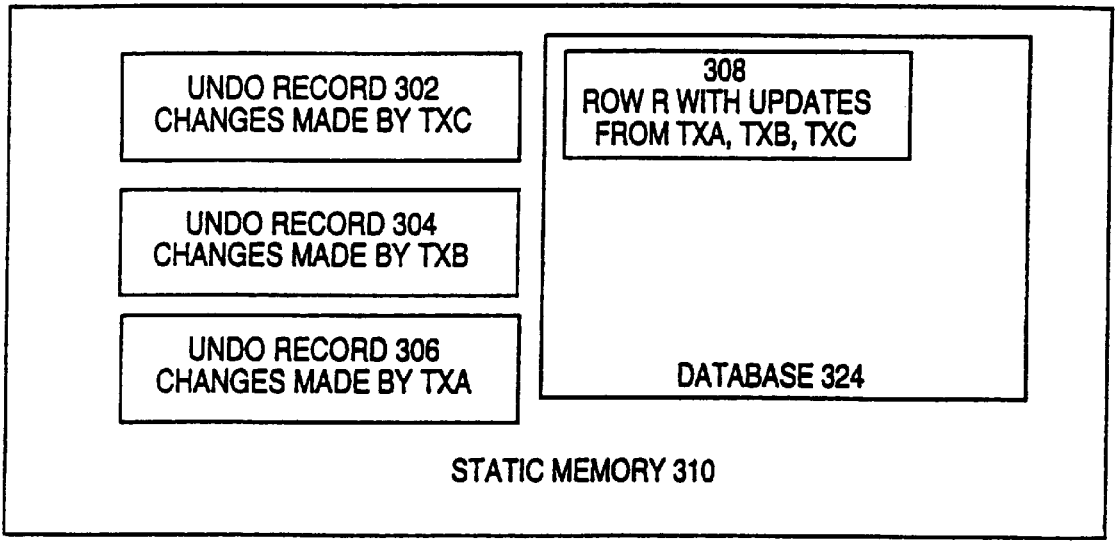
Figure 3C:
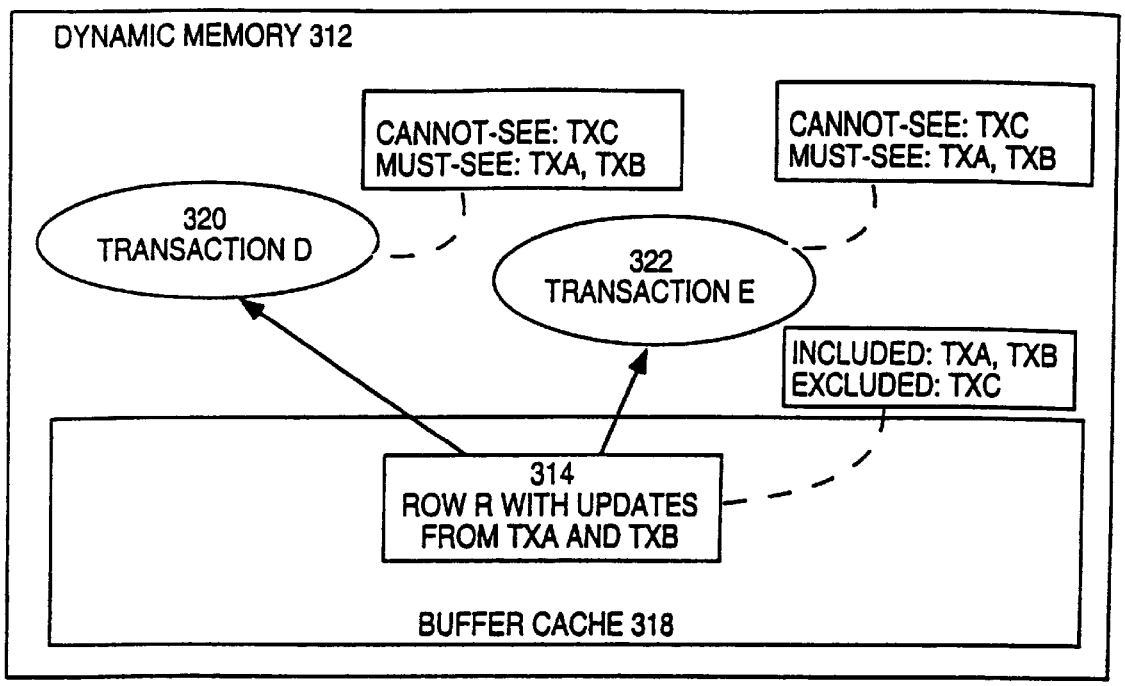
FIG. 3C illustrates sharing a version of a data item between two transactions in the computer system of FIG. 3A.
Figure 3C:
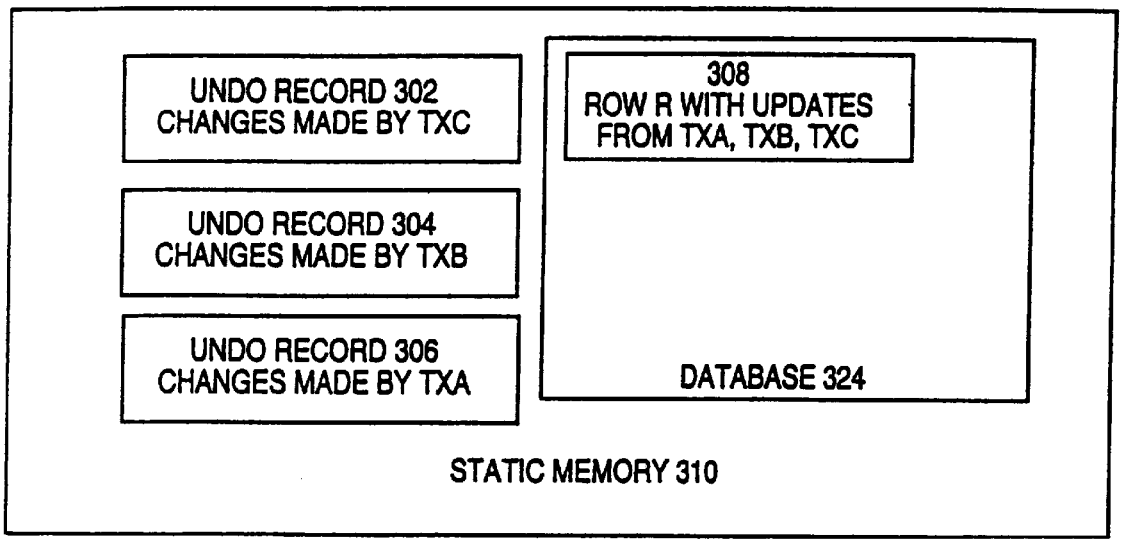

FIGS. 3A–3C illustrate a database system 300 in which the snapshot set associated with a serializable transaction can be dynamically adjusted, as described above. Database system 300 includes a database 324 in which is stored one version of row R 308. The version of row R that is stored in database 324 has been updated by transactions TXA, TXB and TXC, in that order. Undo records for the changes made by TXA, TXB and TXC are stored on static memory 310 as undo records 306, 304, and 302, respectively.

Dynamic memory 312 includes a buffer cache 318 and two active serializable transactions, transaction D 320 and transaction E 322. Associated with each of the active serializable transactions is a CANNOT-SEE set and a MUST-SEE set. In the illustrated embodiment, the CANNOT-SEE set of transaction D includes TXC, and the MUST-SEE set of transaction D includes TXB. This condition indicates that transaction D has previously accessed data that had been updated by TXB and TXC. The version of the data that was supplied to transaction D included the update made by TXB, but did not include the update made by TXC.

Both the MUST-SEE set and the CANNOT-SEE set associated with transaction E are empty, indicating that transaction E has not yet accessed any data that has been modified by any other transaction. Assume that both transaction D and transaction E issue statements to read row R.

In response to the statement issued by transaction D, the database system may first attempt to supply to transaction D a version of row R that does not require reconstruction. In the illustrated example, buffer cache 318 does not currently hold any version of row R. The only version of row R that currently exists is the version of row R stored in database 324. To determine whether transaction D may use the version of row R stored in database 324, the database system determines whether any of the transactions in the INCLUDED set of version 308 of row R are in the CANNOT-SEE set of transaction D, and whether any of the transactions in the EXCLUDED set of version 308 of row R are in the MUST-SEE set of transaction D.

In the illustrated example, the INCLUDED set of version 308 of row R includes TXA, TXB and TXC. The EXCLUDED set of version 308 of row R is empty. Because TXC is in both the INCLUDED set of version 308 and the CANNOT-SEE set of transaction D, transaction D cannot use version 308 of row R. Since no other versions of row R are available, the reconstruction mechanism must create a new version 314 of row R, as shown in FIG. 3b.

The reconstruction mechanism creates version 314 of row R by applying undo record 302 to version 308 of row R. The reconstruction mechanism also stores data to indicate that the included list of version 314 of row R includes TXA and TXB, while the excluded list of version 314 of row R includes TXC. After version 314 of row R has been created, it is stored in a buffer within buffer cache 318, and supplied to transaction D in response to the statement.

In response to supplying transaction D with version 314 of row R, the CANNOT-SEE and MUST-SEE sets of transaction D are updated. Specifically, any transaction in the INCLUDED set of version 314 is added to the MUST-SEE set of transaction D. Any transaction in the EXCLUDED set of version 314 is added to the CANNOT-SEE set of transaction D. In the present example, TXC already belongs to the CANNOT-SEE set of transaction D, and TXB already belongs to the MUST-SEE set of transaction D. Therefore, the only update required is the addition of TXA to the MUST-SEE set of transaction D.

In response to the statement issued by transaction E, the database system determines whether transaction E may be supplied a version of row R that does not require reconstruction. In the illustrated example of FIG. 3b, version 314 of row R is stored in buffer cache 318, and version 308 of row R is stored in database 324. Because the CANNOT-SEE and MUST-SEE sets of transaction E are currently empty, the database system may supply either of the available versions to transaction E. However, if version 308 is supplied to transaction E, an additional buffer within buffer cache 318 would have to be used. Therefore, to preserve buffer space, the database system 300 may determine that it is more efficient to supply version 314 of row R to transaction E.

In response to supplying transaction E with version 314 of row R, the CANNOT-SEE and MUST-SEE sets of transaction E are updated. Specifically, any transaction in the INCLUDED set of version 314 is added to the MUST-SEE set of transaction E. Any transaction in the EXCLUDED set of version 314 is added to the CANNOT-SEE set of transaction E. In the present example, TXC is added to the CANNOT-SEE set of transaction D, and TXA and TXB are added to the MUST-SEE set of transaction E. The status of database system 300 after supplying version 314 to both transactions D and E is illustrated in FIG. 3C.

Included Set Approximation Mechanism

In the foregoing discussion, for the purposes of explanation, the INCLUDED set associated with a version of data and the MUST-SEE set associated with a serializable transaction are indicated by lists of transaction identifiers. However, it will often be impractical to store the members of these sets in a list format. For example, during the life of a database, a particular data item may be updated by millions of transactions. These million transactions would belong to the INCLUDED set or the EXCLUDED set of every version of the data item, and would have to be added to the MUST-SEE set or the CANNOT-SEE set of every transaction that accesses the data item. It would be impractical to maintain million-element lists to track the members of these sets.

According to one embodiment of the invention, the need to store vast amounts of data for INCLUDED sets is avoided by assuming that the INCLUDED set of a data item includes all transactions that committed before the most recently committed transaction that updated the data item. Using this assumption, the INCLUDED set of a data item may be represented by a single value, referred to herein as an "include-time". The include-time of a version of a data item is the commit time of the most recently committed transaction whose updates are reflected in the version of the data item.

For example, assume that a version 1 a data item X was updated by transactions TXA, TXB and TXC. TXA committed at time T, TXB committed at time T+1, and TXC committed at time T+2. Based on the assumption set forth above, all transactions that committed at or before time T+2 are considered to be in the INCLUDED set of version 1 of data item X. Consequently, T+2 is the "include-time" of version 1 of data item X.

Assume that a reconstruction mechanism creates a version 2 of data item X, where the update made by TXC has been removed. Under these circumstances, TXB was the most recently committed transaction whose updates are reflected in version 2 of data item X. Consequently, the "include-time" of version 2 of data item X would be T+1. All transactions that committed before T+1 would be members of the INCLUDED set of version 2 of data item X. TXC would be a member of the EXCLUDED set of version 2 of data item X.

By storing the "include-time" of a version, a database system may determine whether a given transaction is a member of the INCLUDED set represented by the include time by comparing the include time to the commit time of the transaction. Specifically, if the commit time of a transaction is less than or equal to an include time, then the transaction is a member of the INCLUDED set represented by the include time. Conversely, if the commit time of a transaction is greater than an include time, then the transaction is not a member of the INCLUDED set represented by the include time.

As mentioned above, a serializable transaction cannot be supplied a particular version of a data item if any member of its CANNOT-SEE set is a member of the INCLUDED set of the particular version of the data item. In an embodiment that uses include times to represent INCLUDED sets, the database system may make this determination simply by determining whether any transaction in the CANNOT-SEE set committed before the included time of the version of the data item.

MUST-SEE Set Approximation Mechanism

Similar to INCLUDED sets, MUST-SEE sets may include millions of transactions. According to one embodiment of the invention, a MUST-SEE set is represented by a MUST-SEE time. All transactions that committed at or before a MUST-SEE time are considered to be in the MUST-SEE set represented by the MUST-SEE time. Consequently, a serializable transaction must see all changes made by all transactions that committed at or before the MUST-SEE time associated with the serializable transaction.

As mentioned above, when a version of a data item is supplied to a serializable transaction, all of the members of the INCLUDED set associated with the version are added to the MUST-SEE set of the serializable transaction. In an embodiment that uses include times and MUST-SEE times, this is performed by setting the MUST-SEE time associated with the serializable transaction to the include time associated with the version supplied to the serializable transaction when the included time is greater (later) than the MUST-SEE time. That is, NMST=MAX( OMST, IT), where NMST is the new MUST-SEE time of the serializable transaction, OMST is the old MUST-SEE time of the serializable transaction, and IT is the include time of the version of data that is supplied to the serializable transaction.

By storing the MUST-SEE of a serializable transaction, a database system may determine whether a given transaction is a member of the MUST-SEE set represented by the MUST-SEE time by comparing the MUST-SEE time to the commit time of the transaction. Specifically, if the commit time of a transaction is less than or equal to a MUST-SEE time, then the transaction is a member of the MUST-SEE set represented by the MUST-SEE time. Conversely, if the commit time of a transaction is greater than a MUST-SEE time, then the transaction is not a member of the MUST-SEE set represented by the MUST-SEE time.

As mentioned above, a serializable transaction cannot be supplied a particular version of a data item if any member of its MUST-SEE set is a member of the EXCLUDED set of the particular version of the data item. In an embodiment that uses MUST-SEE times to represent MUST-SEE sets, the database system may make this determination simply by determining whether any transaction in the "EXCLUDED" set committed before the MUST-SEE time of the serializable transaction.

Excluded Set Approximation

The EXCLUDED set of a version of a data item includes both (1) those transactions whose updates have been removed from the version of the data item, and (2) those transactions that subsequently update the data item. The set of transactions whose updates are removed from a version during a reconstruction operation will be relatively small, and therefore each transaction in the set may be specifically identified. In contrast, the set of transactions that subsequently update the data item may be infinitely large. Therefore, the set of transactions that subsequently update the data item must be approximated.

Significantly, none of the transactions that subsequently update a data item can be committed at the time a version of the data item is reconstructed. Conversely, all of the transactions that have not committed at the time a version of the data item is reconstructed may potentially update the data item in the future. Therefore, all transactions that are not committed at the time a version of a data item is reconstructed are assumed to be in the EXCLUDED set of that version of the data item. The portion of the EXCLUDED set that is associated transactions that will perform future updates may therefore be represented by storing the time a version of a data item is reconstructed (the "exclude time") with the reconstructed version of the data item.

CANNOT-SEE Set Approximation Mechanism

Similar to EXCLUDED sets, CANNOT-SEE sets include a potentially infinite number of transactions. According to one embodiment of the invention, the portion of a CANNOT-SEE set that corresponds to future transactions is represented by a CANNOT-SEE time. All transactions that committed at or after a CANNOT-SEE time are considered to be in the CANNOT-SEE set represented by the CANNOT-SEE time. Consequently, a serializable transaction cannot see changes made by any transactions that commit at or after the CANNOT-SEE time associated with the serializable transaction.

As mentioned above, when a version of a data item is supplied to a serializable transaction, all of the members of the EXCLUDED set associated with the version are added to the CANNOT-SEE set of the serializable transaction. In an embodiment that uses exclude times and CANNOT-SEE times, this is performed by setting the CANNOT-SEE time associated with the serializable transaction to the exclude time associated with the version supplied to the serializable transaction when the exclude time is smaller (earlier) than the CANNOT-SEE time. That is, NCST=MIN( OCST, ET), where NCST is the new CANNOT-SEE time of the serializable transaction, OCST is the old CANNOT-SEE time of the serializable transaction, and ET is the exclude time of the version of data that is supplied to the serializable transaction.

By storing the CANNOT-SEE time of a serializable transaction, a database system may determine whether a given transaction is a member of the CANNOT-SEE set represented by the CANNOT-SEE time by comparing (1) the transaction against any explicitly enumerated transactions in the CANNOT-SEE set and (2) the CANNOT-SEE time to the commit time of the transaction. Specifically, if the commit time of a transaction is greater than or equal to a CANNOT-SEE time, then the transaction is a member of the CANNOT-SEE set represented by the CANNOT-SEE time even though the transaction is not specifically identified in the CANNOT-SEE set. Conversely, if the commit time of a transaction is less than a CANNOT-SEE time, then the transaction is not a member of the CANNOT-SEE set represented by the CANNOT-SEE time unless the transaction is explicitly identified in the CANNOT-SEE set.

As mentioned above, a serializable transaction cannot be supplied a particular version of a data item if any member of its CANNOT-SEE set is a member of the INCLUDED set of the particular version of the data item. In an embodiment that uses CANNOT-SEE times to represent CANNOT-SEE sets, the database system may make this determination simply by determining whether any transaction in the "INCLUDED" set committed after the CANNOT-SEE time of the serializable transaction.

Figure 5:
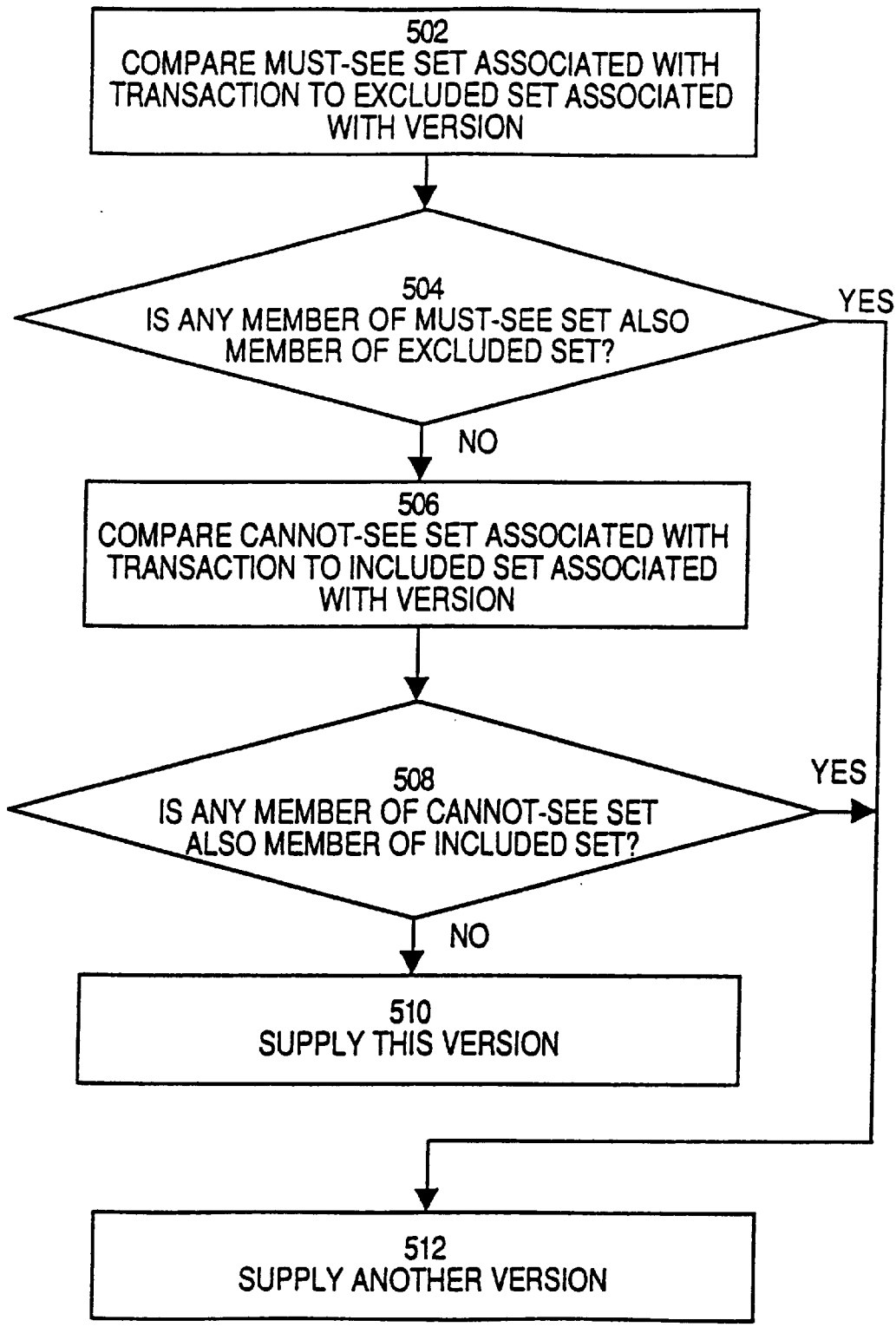
FIG. 5 is a flow chart illustrating steps for determining whether a particular version of a data item may be used by a transaction according to an embodiment of the invention.

Referring to FIG. 5, it is a flow chart illustrating steps for determining whether a particular version of a data item may be used by a transaction according to an embodiment of the invention. At step 502, a MUST-SEE set associated with the transaction is compared to an EXCLUDED set associated with the particular version. As explained above, the MUST-SEE set includes all transactions that have made updates that must be seen by the transaction, and the EXCLUDED set includes all transactions that have made updates to the data item that have been removed from the particular version of the data item or that subsequently make updates to the data. The MUST-SEE set of a transaction may be represented by a MUST-SEE time value, where all transactions that committed prior to the time represented by the MUST-SEE time value are considered to be in the MUST-SEE set. Therefore, the step of comparing a MUST-SEE set associated with the transaction to an EXCLUDED set associated with the particular version may be performed by determining whether any transaction in the EXCLUDED set committed before the time indicated by the MUST-SEE time value.

At step 504, it is determined whether any member of the MUST-SEE set is also a member of the EXCLUDED set. If any member of the MUST-SEE set is also a member of the EXCLUDED set, control proceeds to step 512. Otherwise control proceeds to step 506.

At step 506, a CANNOT-SEE set associated with the transaction is compared to an INCLUDED set associated with the particular version. The CANNOT-SEE set includes all transactions that have made updates that cannot be seen by the transaction, and the INCLUDED set includes all transactions that have made updates that are reflected in the particular version of the data item. As mentioned above, an INCLUDED time value may be used to represent the INCLUDED set, where all transactions that committed prior to the time represented by the INCLUDED time value are considered to be in the INCLUDED set. Therefore, the step of comparing a CANNOT-SEE set associated with the transaction to an INCLUDED set associated with the particular version may be performed by determining whether any transaction in the CANNOT-SEE set committed before the time indicated by the INCLUDED time value.

At step 508, it is determined whether any member of the CANNOT-SEE set is also a member of the INCLUDED set. If any member of the CANNOT-SEE set is also a member of the INCLUDED set, then control proceeds to step 512. Otherwise, control proceeds to step 510.

At step 510, the particular version of the data item is supplied to the transaction. This step is performed if no member of the MUST-SEE set is also a member of the EXCLUDED set, and no member of the CANNOT-SEE set is also a member of the INCLUDED set.

At step 512, a different version of the data item is supplied to the transaction. This step is performed when any member of the MUST-SEE set is also a member of the EXCLUDED set, or any member of the CANNOT-SEE set is also a member of the INCLUDED set.

Figure 6:
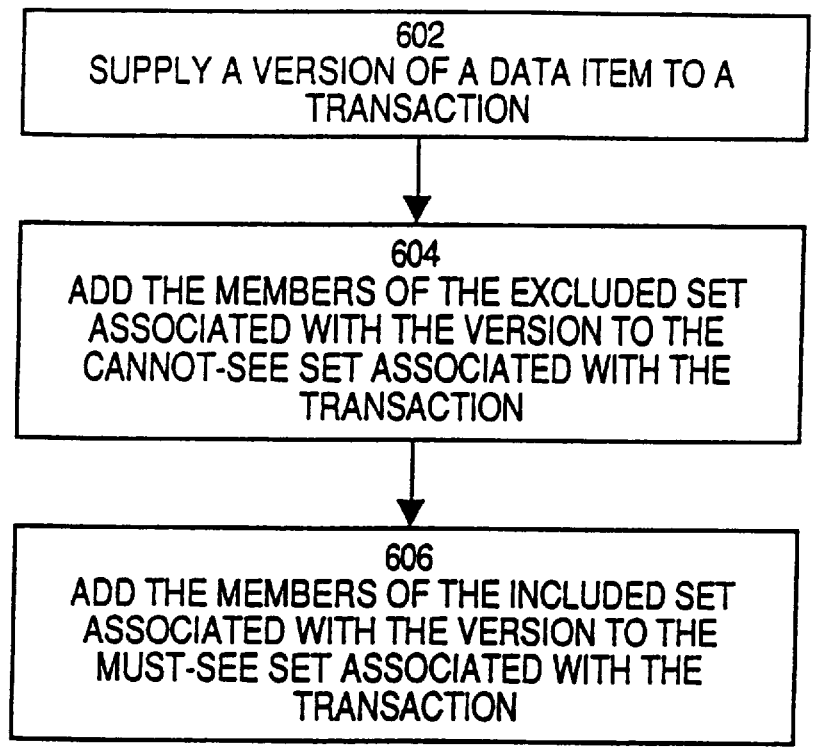
FIG. 6 is a flow chart illustrating the steps performed in response to supplying a particular version of a data item to a transaction, according to one embodiment of the invention.

FIG. 6 is a flow chart illustrating the steps performed in response to supplying a particular version of a data item to a transaction. At step 602 the version of the data item is supplied to the transaction. At step 604, the members of the EXCLUDED set associated with version of the data item are added to the CANNOT-SEE set associated with the transaction. This may be performed by setting the CANNOT-SEE time of the transaction to lesser of the current CANNOT-SEE time and the exclude time associated with the version of the data item, and by adding to the CANNOT-SEE set of the transaction data that identifies any transactions whose changes were removed from the version of the data item.

At step 606, the members of the INCLUDED set associated with the version of the data item are added to the MUST-SEE set associated with the transaction. The step of adding the members of the INCLUDED set to the MUST-SEE set may be performed, for example, by setting the MUST-SEE time value to the greater of the MUST-SEE time value and the INCLUDED time value.

Version Selection Strategies

The database system often has many options with respect to which version of a data item to supply to a serializable transaction. The CANNOT-SEE/INCLUDED and MUST-SEE/EXCLUDED set comparisons merely indicate which versions of a data item can be supplied to a serializable transaction. The set comparisons themselves do not dictate any strategy with respect to choosing which of the versions that can be supplied to the serializable transaction actually should be supplied to the serializable transaction.

Figure 4:
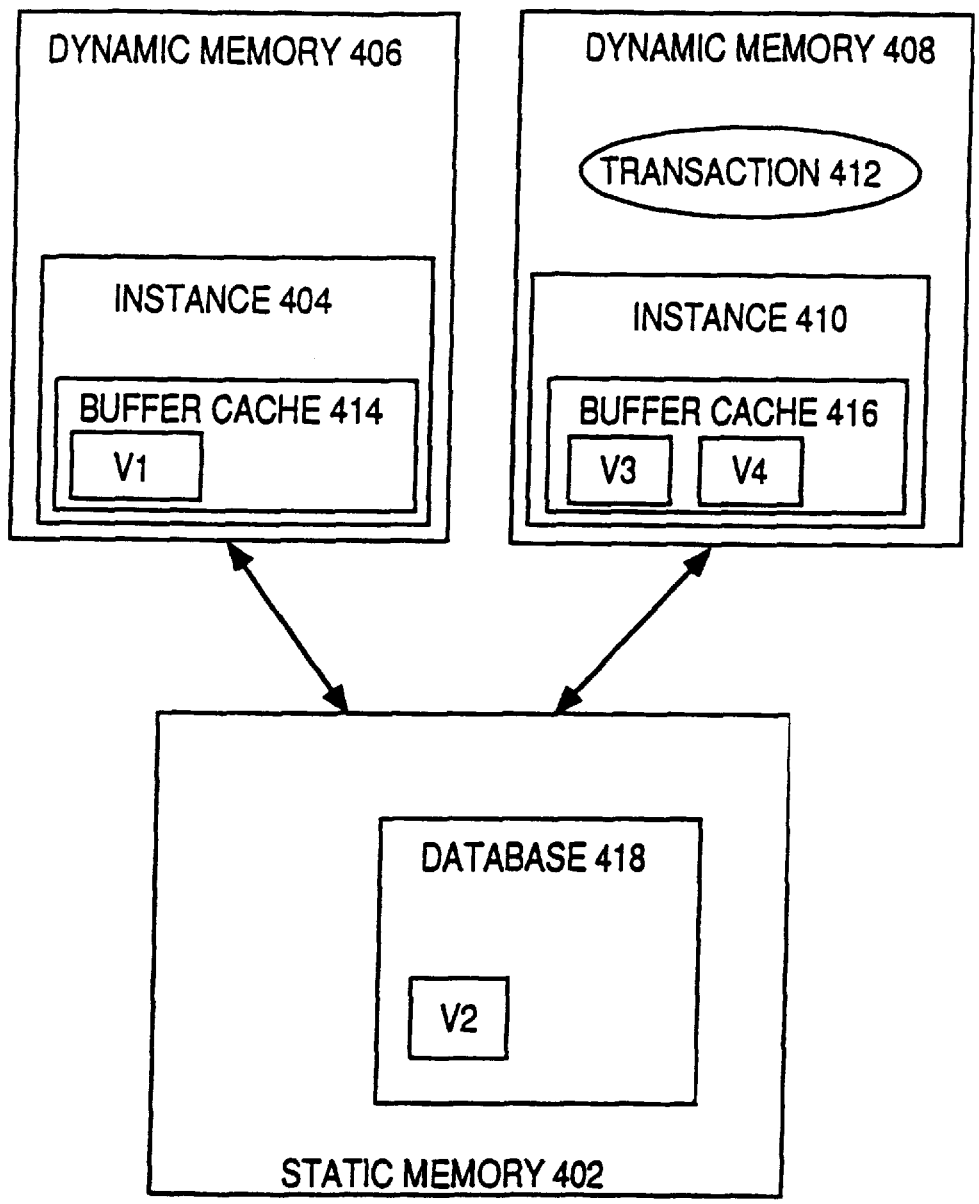
FIG. 4 is a block diagram of a computer system in which exist multiple versions of a data item that has been requested by a transaction.

FIG. 4 illustrates a database system 400 in which two sets of database servers (two "database instances" 404 and 410) have access to the same database 418. Typically, each of database instances 404 and 410 will reside in the dynamic memory of different nodes. Each node may include one or more processors and one or more regions of dynamic memory. Nodes, in this context, may either be different workstations on a network or different clusters within a multi-processing machine.

In the illustrated system 400, instance 404 resides in dynamic memory 406 and instance 410 resides in dynamic memory 408. Each database instance 404 and 410 includes its own buffer cache 414 and 416. Database 418 resides on static memory 402 accessible to both instances 404 and 410. Static memory 402 may include one or more optical or magnetic disks.

A first version (V1) of a particular data item is stored in the buffer cache 414 of instance 404. A second version of the data item (V2) is stored in database 418. A third and fourth version of the data item (V3 and V4) are stored in the buffer cache 416 of instance 410. If a serializable transaction 412 connected to instance 410 issues a statement that accesses the data item, instance 410 must determine which version of the data item to supply to serializable transaction 412. Assuming that the MUST-SEE and CANNOT-SEE sets of the serializable transaction 412 are currently empty, instance 410 may supply the serializable transaction 412 with any one of versions V1, V2, V3 or V4 of the data item, or may reconstruct a new version of the data item to supply to serializable transaction 412.

In deciding which of the versions that can be supplied to the serializable transaction should be supplied to the serializable transaction, a database instance may take into account numerous factors, including the location of the version, the recency of the version, and the number of other transactions using the version. For versions that have not yet been reconstructed, the computer system may consider the amount of computation that would be required to reconstruct the version, and the likelihood that other transactions would be able to share the version.

Regency Considerations

It is generally preferable to supply to serializable transactions newer versions of data items rather than older versions of data items. For example, if version V1 reflects all of the changes that were made to a data item more than one minute ago, and version V2 only reflects those changes made to the data item more than a month ago, it is preferable to supply a serializable transaction with V1 of the data item. Further, a newer version of a data item will take less processing to reconstruct than an older version of a data item because less undo records need to be applied during the reconstruction process.

For many applications, use of old versions of data items is simply unacceptable. For example, a stock broker could not competently advise clients based on stock values that may be days or weeks old. Similarly, real estate agents demand access to current asking prices and listings.

According to one embodiment of the invention, the database system includes a mechanism to avoid the use of old versions by initializing the MUST-SEE time value of each serializable transaction to a value that ensures that the serializable transaction will not be supplied versions that are older than some predetermined age. Specifically, when a serializable transaction begins execution, the database system initializes the MUST-SEE time value associated with the serializable transaction to a time value that represents a time no later than (PT−DELAY), where PT is the present time and DELAY is the maximum interval of time allowed between when a transaction commits and when the changes made by the transaction are seen by new transactions.

For example, assume that transaction TXA commits at time T1 and transaction TXB begins execution at time T2. If T2−T1>DELAY, then the MUST-SEE time of TXB must be set to a value that reflects a time later than T1. Consequently, TXB will always see the changes made by TXA.

In an alternate embodiment, the MUST-SEE time of the transaction may be adjusted every time a serializable transaction performs an operation that requires the transaction to see data from the database. For example, every time TXB issues a statement, the database system determines whether the current MUST-SEE time of TXB is greater than the commit times of all transactions that committed before the Present Time−DELAY. If the MUST-SEE time of TXB is greater than the commit times of all transactions that committed before Present Time−DELAY, then the current MUST-SEE time of TXB is used. If the MUST-SEE time of TXB is less than the commit times of any transaction that committed before the Present Time−DELAY, then the current MUST-SEE time of TXB is updated to a value that reflects a time more recent than Present Time−DELAY.

Regency Enforcement Techniques

One technique to ensure that transactions will always see changes that are older than DELAY involves maintaining a clock counter (CC), a global counter (GC), and an OLD-COUNT value. The clock counter (CC) is a counter that increments every DELAY period. For example, if DELAY is five minutes, then the clock counter (CC) will be incremented once every five minutes. The global counter (GC) increments every time any transaction in any instance commits, and every time the clock counter (CC) increments. Every time the clock counter (CC) increments, the current value of the global counter (GC) is stored in OLDCOUNT. Consequently, OLDCOUNT will always reflect a value that is higher than the commit time of transactions that committed before Present Time−DELAY.

When a transaction commits, the transaction is assigned the current value of GC as a commit time. Before a serializable transaction performs any operation that requires the transaction to be supplied a data item, the MUST-SEE time of the transaction is set to be the maximum of its current MUST-SEE time and the current OLDCOUNT value. Using this strategy, the MUST-SEE time of a transaction will never be less than the commit time of any committed transactions that committed earlier than Present Time−DELAY. Therefore, all serializable transactions will see all transactions that committed before Present Time−DELAY.

Increasing The Cache Hit Rate

A version of a data item that is already in a buffer cache of a database instance can be supplied to a transaction connected to that database instance faster than a version of a data item that is not already in the buffer cache because the operation of copying the data into the buffer cache does not have to be repeated. Further, if the version of the data item is a reconstructed version, the reconstruction operation will have already been performed and does not have to be repeated. Thus, referring to FIG. 4, versions V3 and V4 can be supplied to transaction 412 faster than versions V1 or V2.

Supplying a transaction with a version of a data item that is already in the local buffer cache also reduces the amount of buffers occupied by each data item. For example, another buffer in buffer cache 416 would have to be used to supply either version V1 or V2 to transaction 412. Because V3 and V4 are already in buffer cache 416, no additional buffer space would be required to supply either V3 or V4 to transaction 412.

In addition to increasing the cache hit rate for data items supplied to transactions, decreasing the number of possible snapshots in use increases the cache hit rate for data other than the data items to be supplied to transactions. Specifically, when the database system reconstructs a version of a data item, the database system must retrieve (1) an existing version of the data item and (2) information required to reconstruct the desired version of the data item from the existing version of the data item. This information is hereinafter referred to as "reconstruction data". Reconstruction data may include, for example, information from undo records and information about the commit times of committed transactions.

There may be overlap between the reconstruction data required to reconstruct a particular version of one data item, and the reconstruction data required to reconstruct a particular version of another data item. For example, the same information about committed transactions may be needed during both reconstruction operations. If two serializable transactions are seeing the same snapshot of the database, it is more likely that some of the reconstruction data that has already been retrieved to create a version of a data item supplied to one of the serializable transactions will contain some of the reconstruction data required to create a version of a different data item to be supplied to the other of the serializable transactions.

Reducing the Ping Rate

As mentioned above, it is more efficient to supply a transaction with a version of a data item stored in a local cache than to supply a version of a data item that is not stored in the local cache. Similarly, a version of a data item that is stored on disk can be supplied to a transaction connected to one database instance more efficiently than a version of the data item that is stored in the buffer cache of another database instance. A situation in which data from a remote cache must be supplied to a transaction is referred to as a "ping".

Pings are particularly costly if the version of the data item is a reconstructed version. Typically, to supply a transaction with a reconstructed version of a data item that is stored in a buffer cache of remote instance, all of the information required to reconstruct the version of the data item (e.g. undo information, transaction information) must be sent from the remote instance to the local instance to enable the local instance to reconstruct the version of the data item. Therefore, in the example illustrated in FIG. 4, versions V3, V4 and V2 may be supplied to transaction 412 with less overhead than version V1.

Sharing Snapshots

Before a serializable transaction is supplied data, the serializable transaction must be assigned a snapshot of the database. Some constraints are placed on the particular snapshot that can be assigned to a given serializable transaction. Specifically, the snapshot assigned to the transaction must include the changes made by all of the transactions that were reflected in snapshots previously assigned to the transaction. In addition, the snapshot assigned to the transaction must exclude the changes made by all of the transactions that have been excluded from snapshots previously assigned to the transaction.

At any given time, a multiplicity of snapshots could satisfy the constraints described above for a particular serializable transaction. Therefore, the snapshot assignment mechanism must use some criteria to determine which of many possible snapshots to assign to a serializable transaction before supplying a data item to the serializable transaction. According to one embodiment of the invention, the cache hit rate is increased by employing a snapshot assignment mechanism that favors the assignment of snapshots that are already in use by other transactions.

For example, assume that transactions TXA, TXB and TXC are the only transactions executing in a database system. Assume that, at time T1, TXA is the first of the three transactions to access a data item. Before TXA may be supplied a version of the data item, TXA must be assigned a snapshot of the database. Because TXA has not yet been assigned any snapshot, there are no constraints with respect to which snapshot may be assigned to transaction TXA. Based on the recency considerations described above, the snapshot assignment mechanism may assign to TXA the most recent snapshot of the database (SNAPSHOT-T1).

Assume that at time T2, TXB accesses a data item. Before TXB may be assigned a version of the data item, TXB must be assigned a snapshot of the database. Because TXB has not yet been assigned any snapshot, there are no constraints with respect to which snapshot may be assigned to transaction TXB. Recency considerations would suggest that TXB be assigned the most recent snapshot of the database (SNAPSHOT-T2). However, to increase version sharing between TXA and TXB, the snapshot assignment mechanism assigns to TXB the SNAPSHOT-T1, the same snapshot that was assigned to TXA.

Similarly, when TXC first accesses a data item at time T3, TXC is assigned SNAPSHOT-T1. Consequently, transactions TXA, TXB and TXC will share SNAPSHOT-T1 until one or more of the three transactions reads data that was updated by a transaction that does not belong to SNAPSHOT-T1. During the time that TXA, TXB and TXC share the same snapshot (SNAPSHOT-T1), the three transactions will be able to share the same versions of the data items that they access.

Group MUST-SEE Values

One mechanism for favoring the assignment of shared snapshots involves maintaining group MUST-SEE values. A group MUST-SEE value is a MUST-SEE value that is associated with a group of transactions, rather than with single transaction. Each transaction in the group also maintains its own MUST-SEE value.

The group MUST-SEE time represents the snapshot that, ideally, all transactions within the group will share (the "target snapshot"). To the extent that the MUST-SEE value of each transaction in the group equals the MUST-SEE value of the group, the transactions that belong to the group will be able to share the same versions of data items with the other transactions that belong to the group, rather than having to reconstruct their own versions.

According to one embodiment of the invention, the MUST-SEE value of a transaction is set to the MUST-SEE value of the group to which the transaction belongs when the transaction begins execution. Because this initialization is performed for all transactions in the group, all transactions in the group will, by default, use the target snapshot of the database.

The MUST-SEE value for a transaction within the group will change when the transaction updates a version of a data item that has an INCLUDE time that is greater than the MUST-SEE time of the transaction. When this occurs, the MUST-SEE time of the transaction will no longer equal the MUST-SEE time of the group. Consequently, a different snapshot of the database will apply to the transaction, and the transaction may not be able to use the same versions of a data item as the other transactions within the group.

In an embodiment that uses group MUST-SEE times, the recency considerations described above may be addressed by periodically adjusting the group MUST-SEE time of each group. Specifically, if each group MUST-SEE time is maintained to always reflect a snapshot that is not older than Present Time–DELAY, then transactions within the group will always see transactions that are older than ET–DELAY, where ET is the time that the transaction begins execution.

The group MUST-SEE times may be maintained to always reflect times that are not older than Present Time–DELAY by using the clock counter (CC) and global counter (GC) described above. Specifically, with each increment of the clock counter (CC), the global counter (GC) is incremented and each group MUST-SEE is set to the value of the global counter (GC). All committed transactions will have a commit time lower than the global counter (GC). Therefore, at the time a group MUST-SEE is set to the value of the global counter (GC), the group MUST-SEE time will be equal to or greater than the commit time of all committed transactions. Thus, the new target snapshot of the group will include all transactions committed as of the last increment of the clock counter (CC). Consequently, during the next DELAY period, all transactions that are assigned the group MUST-SEE are guaranteed to see all committed transactions that committed before Present Time–DELAY.

As explained above, a new target snapshot for the group is established when the group MUST-SEE time is updated to the value of the global counter (GC). According to one embodiment of the invention, use of the new target snapshot is favored over use of an old target snapshot, or any snapshot between the new and old target snapshots. Transactions within the group may be assigned the new target snapshot by setting the MUST-SEE time of each transaction in the group to the new group MUST-SEE time. According to one embodiment, this is performed by assigning the MUST-SEE time of a transaction within the group to the greater of its current MUST-SEE time and the current group MUST-SEE time when the transaction accesses data.

Figure 7:
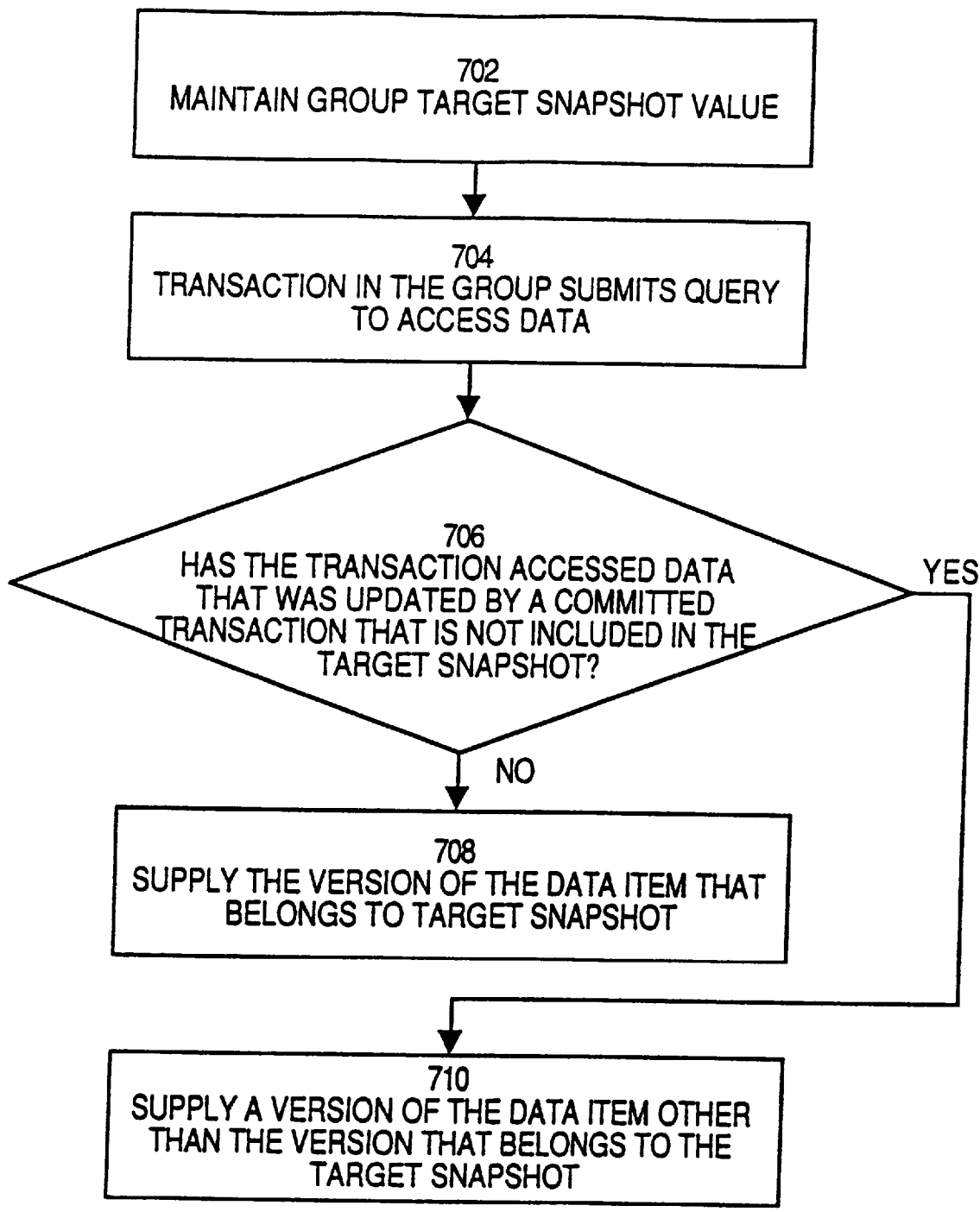
FIG. 7 is a flow chart illustrating a method for supplying data from a database to a group of transactions according to an embodiment of the invention.

Referring to FIG. 7, it is a flow chart illustrating a method for supplying data from a database to a group of transactions according to an embodiment of the invention. At step 702, a target snapshot value for the group of transactions is established. At step 704, a transaction within the group submits a statement to access data.

At step 706, it is determined whether the transaction accessed data that was updated by a committed transaction that is not included in the target snapshot. According to one embodiment, this step is performed by determining whether the transaction has accessed data that was updated by a transaction that committed after a commit time associated with the snapshot.

If the transaction accessed data that was updated by a committed transaction that is not included in the target snapshot, then control proceeds to step 710. At step 710, a version of the data item other than the version that belongs to the target snapshot is provided to the transaction. If the transaction did not access data that was updated by a committed transaction that is not included in the target snapshot, then control proceeds to step 708. At step 708, the version of the data item that belongs to the target snapshot is provided to the transaction.

Reducing the Number of Snapshots

Every distinct commit time represents a distinct snapshot of the database. Specifically, each commit time corresponds to a snapshot that includes changes made by all transactions that committed before the commit time and excludes changes made by all transactions that commit after the commit time.

For example, assume that transactions TXA, TXB and TXC commit, in that order. If transactions TXA, TXB and TXC are given different commit times, three new snapshots of the database exist: a snapshot that reflects updates made by TXA but not updates made by TXB or TXC, a snapshot that reflects updates made by TXA and TXB but not updates made by TXC, and a snapshot that reflects updates made by TXA, TXB and TXC. If TXA, TXB and TXC are all assigned the same commit time, then only one new snapshot has been created: a snapshot that reflects updates made by TXA, TXB and TXC.

Snapshot sharing between transactions can be increased by decreasing number of snapshots of the database in use by currently executing transactions. With fewer available snapshots, there is a higher snapshot-to-transaction ratio. Consequently, there is a higher likelihood that two transactions will be using or be able to use the same snapshot, and therefore the same versions of data items.

One technique for reducing the number of possible snapshots of a database involves increasing the number of transactions that are assigned the same commit time. The more transactions that are assigned to each commit time, the lower the snapshot-to-transaction ratio. However, some transactions cannot be assigned the same commit time. Specifically, if a transaction TXB "depends on" another transaction TXA, then the transaction TXB must be assigned a commit time that is later than the commit time assigned to the other transaction TXA. A transaction is said to depend on another transaction if (1) the other transaction commits before the transaction, and (2) the other transaction updated a data item that is accessed by the transaction.

For example, if a transaction TXA committed before a transaction TXB, and TXA updated a data item that was supplied to TXB, then TXB depends on TXA. Consequently, the commit time of TXB must be greater than the commit time of TXA. On the other hand, if TXB was never supplied a data item that was updated by TXA, then TXB does not depend on TXA. Therefore, TXA and TXB may be assigned the same commit time, even though TXA committed before TXB in real time.

In the recency enforcement techniques described above, the global counter (GC) is incremented every time any transaction commits. Consequently, the number of snapshots of the database will equal the number of committed transactions. If the global counter (GC) is incremented at a slower rate, some committed transactions will share commit times. Therefore, the number snapshots of the database will be decreased. However, the global counter (GC) must be incremented in a way that ensures that the MUST-SEE time for any serializable transaction will never decrease, and that the commit number assigned to a transaction is greater than the commit time of any transaction on which the transaction depends.

According to one embodiment of the invention, the global counter (GC) is incremented when a transaction commits, but only if the global counter (GC) is not greater than the highest commit time assigned to any of the transactions on which the transaction depends. For example, assume that transaction TXC depends on transactions TXA and TXB. If, when transaction TXC commits, the global counter (GC) is greater than the commit times of TXA and TXB, then TXC is assigned the value of the global counter (GC) without incrementing the global counter (GC). However, if the global counter (GC) is not greater than the commit times of either TXA or TXB, then the global counter (GC) is increased to a value that is higher than the higher of the commit times of TXA and TXB, and TXC is assigned the new value of the global counter (GC).

The transactions on which a given transaction depends are in the MUST-SEE set or the CANNOT-SEE set of the given transaction. Thus, if TXC depends on TXB and TXA, then TXB and TXA will be in either the MUST-SEE set or CANNOT-SEE set to TXC. Consequently, the commit time assigned a given transaction must be greater than the commit time of the latest committing transaction in the MUST-SEE set and CANNOT-SEE set of the transaction.

In an embodiment in which a MUST-SEE time is maintained for each transaction, the MUST-SEE time of a transaction will always be equal to or greater than the latest commit time of all of the transactions in the MUST-SEE set of the transaction. If the CANNOT-SEE set of a transaction is empty, the MUST-SEE time will always be equal to or greater than the latest commit time of all of the transactions on which the transaction depends. Therefore, according to one embodiment of the invention, the global counter (GC) is incremented when the MUST-SEE time of a committing transaction with an empty CANNOT-SEE set is not less than the global counter (GC), and is not incremented when the MUST-SEE time of a committing transaction with an empty CANNOT-SEE set is less than the global counter (GC).

As explained above, certain transactions must be excluded from snapshots because they depend on transactions that are included in the snapshots. However, there may be reasons for excluding transactions from snapshots for other reasons. For example, if GC is incremented (thus creating a new snapshot) every time the clock counter (CC) increments. This effectively excludes all transactions that commit after time T2 from a snapshot that includes a transaction that committed at time T1, where T2−T1>DELAY.

According to one embodiment of the invention, the transactions may also be excluded from snapshots when the transactions were connected to a different instance than the transactions that already belong to the snapshot. For example, assume that TXA, TXB and TXC do not depend on each other, but TXA and TXB were connected to a first database instance and TXC was connected to a second database instance. Because TXC does not depend on TXA or TXB, TXC does not have to be excluded from the snapshot that contains TXA and TXB. However, under these circumstances the snapshot assignment mechanism may choose to exclude TXC from the snapshot containing TXA and TXB because transaction TXC was connected to a different instance than transactions TXA and TXB.

Because TXC is excluded from the snapshot that includes TXA and TXB, the changes made by TXC will not have to be supplied to transactions that see the snapshot that includes TXA and TXB. This will eliminate the "ping" that may otherwise occur when a transaction in the first instance that is using the snapshot that includes TXA and TXB attempts to read a data item that was changed by TXC.

In an embodiment that uses commit times to assign transactions to snapshots, TXA and TXB can be assigned to the same snapshot by assigning the same commit time to both TXA and TXB. Similarly, TXC can be excluded from the snapshot that includes TXA and TXB by assigning TXC a more recent commit time than the commit time assigned to TXA and TXB.

Figure 8:
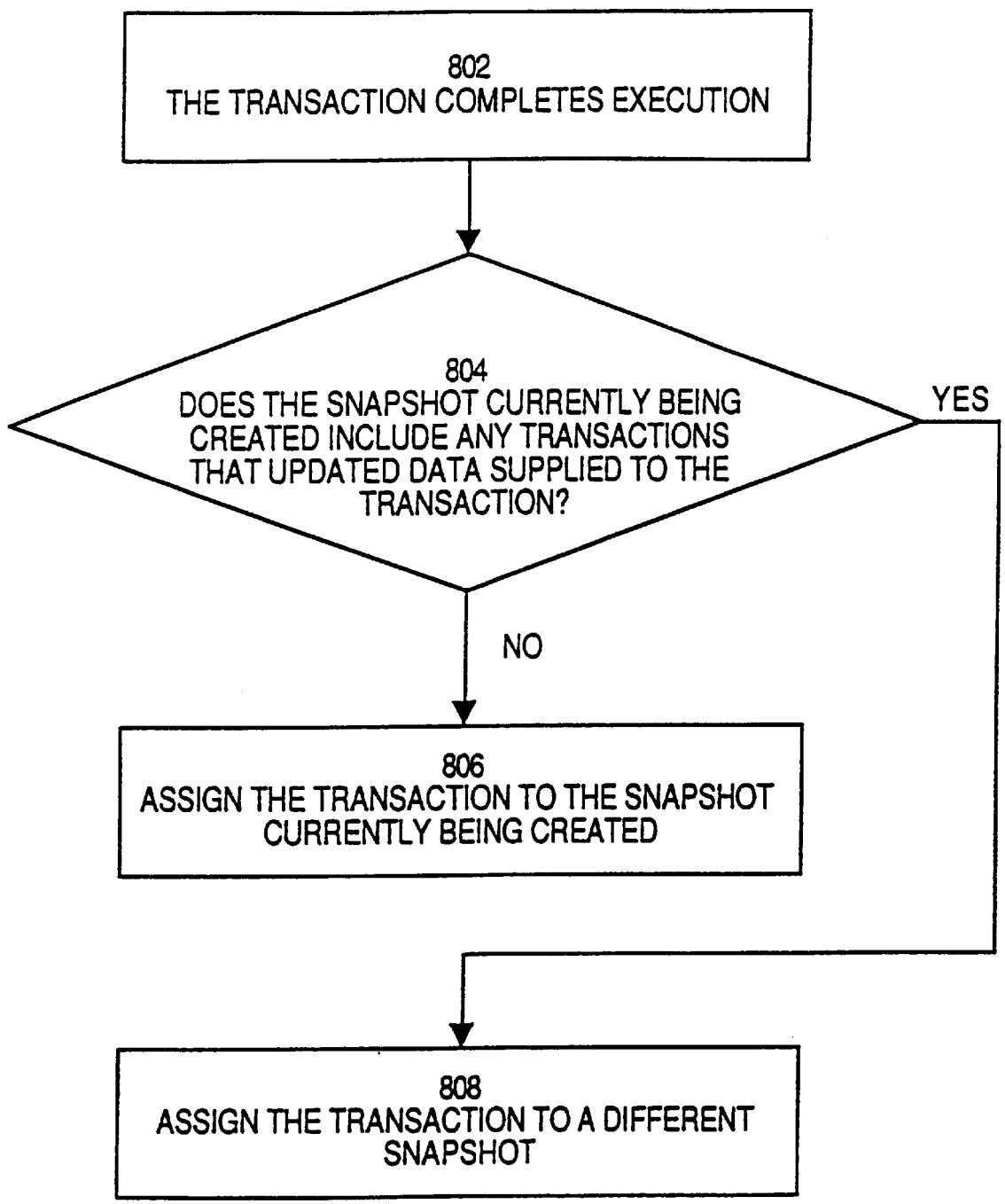
FIG. 8 is a flow chart illustrating a method for assigning a transaction that accesses data in a database to a snapshot in a way that reduces the number of snapshots of the database, according to one embodiment of the invention.

FIG. 8 is a flow chart illustrating a method for assigning a transaction that accesses data in a database to a snapshot in a way that reduces the number of snapshots of the database, according to one embodiment of the invention. At step 802, the transaction completes execution. At step 804, it is determined whether a snapshot currently being created includes any transactions that updated data supplied to the transaction.

In one embodiment, each commit time corresponds to a snapshot. The snapshot "currently being created" is the snapshot the corresponds to the current value of the global counter (GC). The snapshot is "being created" because transactions that commit may still be added to the snapshot by setting the commit time of the transactions to the current value of the global counter (GC). In this embodiment, step 804 may be performed by determining whether any transactions on which the transaction depends have been assigned the current value of the global counter (GC) as their commit time.

If the snapshot currently being created includes any transactions that updated data supplied to the transaction, then control proceeds to step 808. At step 808, the transaction is assigned to a different snapshot than the snapshot currently being created. This may be performed, for example, by incrementing the global counter (GC) and assigning the new global counter value as the commit time of the transaction.

If the snapshot currently being created does not include any transactions that updated data supplied to the transaction, then control proceeds to step 806. At step 806, the transaction is assigned to the snapshot currently being created. This may be performed, for example, by assigning the current value of the global counter (GC) as the commit time of the transaction.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for determining whether a particular version of a data item may be used by a transaction, the method comprising the steps of:

comparing a MUST-SEE set associated with the transaction to an EXCLUDED set associated with the particular version, the MUST-SEE set including all transactions that have made updates that must be seen by the transaction, the EXCLUDED set including all transactions that have made updates to the data item that have been removed from the particular version of the data item and all transactions that will make changes to the data item in the future; and comparing a CANNOT-SEE set associated with the transaction to an INCLUDED set associated with the particular version, the CANNOT-SEE set including all transactions that have made updates that cannot be seen by the transaction, the INCLUDED set including all transactions that have made updates that are reflected in the particular version of the data item; and determining that the particular version can be supplied to the transaction if no member of the MUST-SEE set is also a member of the EXCLUDED set, and no member of the CANNOT-SEE set is also a member of the INCLUDED set; and determining that the particular version cannot be supplied to the transaction if any member of the MUST-SEE set is also a member of the EXCLUDED set, or any member of the CANNOT-SEE set is also a member of the INCLUDED set.

2. The method of claim 1 further comprising the steps of:

supplying the particular version of the data item to the transaction if no member of the MUST-SEE set is also a member of the EXCLUDED set, and no member of the CANNOT-SEE set is also a member of the INCLUDED set; and in response to supplying the particular version of the data item to the transaction, performing the steps of
adding the members of the EXCLUDED set to the CANNOT-SEE set; and
adding the members of the INCLUDED set to the MUST-SEE set.

3. The method of claim 1 further comprising the steps of:

storing a MUST-SEE time value to represent the MUST-SEE set, wherein all transactions that committed prior to the time represented by the MUST-SEE time value are considered to be in the MUST-SEE set; and determining a INCLUDED time value to represent the INCLUDED set, wherein all transactions that committed prior to the time represented by the INCLUDED time value are considered to be in the INCLUDED set.

4. The method of claim 3 wherein the step of determining the INCLUDED time value includes determining a commit time of a last transaction to commit of all the transactions that performed updates that are reflected in the particular version of the data item.

5. The method of claim 2 further comprising the steps of:

storing a MUST-SEE time value to represent the MUST-SEE set, wherein all transactions that committed prior to the time represented by the MUST-SEE time value are considered to be in the MUST-SEE set; and determining an INCLUDED time value to represent the INCLUDED set, wherein all transactions that committed prior to the time represented by the INCLUDED time value are considered to be in the INCLUDED set.

6. The method of claim 5 wherein the step of adding the members of the INCLUDED set to the MUST-SEE set comprises setting the MUST-SEE time value to the greater of the MUST-SEE time value and the INCLUDED time value.

7. The method of claim 3 wherein:

the step of comparing a MUST-SEE set associated with the transaction to an EXCLUDED set associated with the particular version includes determining whether any transaction in the EXCLUDED set committed before the time indicated by the MUST-SEE time value; and the step of comparing a CANNOT-SEE set associated with the transaction to an INCLUDED set associated with the particular version includes determining whether any transaction in the CANNOT-SEE set committed before the time indicated by the INCLUDED time value.

8. The method of claim 1 further comprising the step of resetting the MUST-SEE set associated with the transaction and the CANNOT-SEE set associated with the transaction for every statement in the transaction.

9. The method of claim 1 further comprising the steps of:

the transaction issuing a statement that requires access to the data item and a second data item;

supplying a version of the second data item to the transaction before supplying a version of the data item to the transaction;

adding to the MUST-SEE set of the transaction all transactions that have made updates to the second data item that have not been removed from the version of the second data item that was supplied to the transaction; and adding to the CANNOT-SEE set of the transaction all transactions that have made updates to the second data item that have been removed from the version of the second data item that was supplied to the transaction and all transactions that will update the second data item in the future.

10. The method of claim 1 further comprising the step of adding all transactions that committed prior to a predetermined time to the MUST-SEE set associated with the transaction.

11. The method of claim 10 wherein the predetermined time is a predetermined amount of time previous to a current time.

12. A method for determining whether a particular version of a first data item may be supplied to a transaction in response to a statement, the method comprising the steps of:

supplying a particular version of a second data item to said transaction in response to said statement;

adding transactions whose updates are reflected in the particular version of the second data item to a MUST-SEE set associated with said transaction;

adding transactions whose updates have been removed from the particular version of the second data item and transactions who will later update the data item to a CANNOT-SEE set associated with said transaction;

if any transactions in the MUST-SEE set associated with the transaction have made updates that have been removed from the particular version of the first data item, then supplying a different version of the first data item to the transaction;

if any transactions in the CANNOT-SEE set associated with the transaction have made updates reflected in the particular version of the first data item, then supplying a different version of the first data item to the transaction; and if no transactions in the MUST-SEE set associated with the transaction have made updates that have been removed from the particular version of the first data item or subsequently update the first data item and no transactions in the CANNOT-SEE set associated with the transaction have made updates reflected in the particular version of the first data item, then supplying the particular version of the first data item to the transaction.

13. The method of claim 12 wherein the step of adding transactions whose updates are reflected in the particular version of the second data item to a MUST-SEE set includes the step of setting a MUST-SEE time associated with the transaction to a value that reflects a time that is at least as recent as the commit times of the transactions whose updates are reflected in the particular version of the second data item.

* * * * *